US008548804B2

(12) United States Patent
Barrett et al.

(10) Patent No.: US 8,548,804 B2
(45) Date of Patent: Oct. 1, 2013

(54) GENERATING SAMPLE ERROR COEFFICIENTS

(75) Inventors: Paul Barrett, Ipswich (GB); Ludovic Maifait, Ipswich (GB)

(73) Assignee: Psytechnics Limited, Ipswich (GB)

( * ) Notice: Subject to any disclaimer, the term of this patent is extended or adjusted under 35 U.S.C. 154(b) by 1171 days.

(21) Appl. No.: 11/874,967

(22) Filed: Oct. 19, 2007

(65) Prior Publication Data

US 2008/0106249 A1 May 8, 2008

(30) Foreign Application Priority Data

Nov. 3, 2006 (EP) .................................... 06123492

(51) Int. Cl.

*G10L 19/00* (2013.01)
*G10L 15/00* (2013.01)
*G10L 15/04* (2013.01)
*G10L 15/08* (2006.01)
*G10L 15/20* (2006.01)

(52) U.S. Cl.

USPC .......................................... 704/236; 704/200

(58) Field of Classification Search

USPC ............. 704/200–218, 224, 236–240, 270.1, 704/E19.001–E19.049, E21.001–E21.002

See application file for complete search history.

(56) References Cited

U.S. PATENT DOCUMENTS 3,629,510 A * 12/1971 Anderson et al. ............ 704/208
4,058,676 A * 11/1977 Wilkes et al. ................ 704/220
4,782,523 A * 11/1988 Galand et al. ................ 379/386
4,964,166 A * 10/1990 Wilson ......................... 704/229
5,038,658 A * 8/1991 Tsuruta et al. ................. 84/461
5,042,069 A * 8/1991 Chhatwal et al. ............ 704/229
5,091,945 A * 2/1992 Kleijn .......................... 704/219
5,293,448 A * 3/1994 Honda .......................... 704/208
5,381,450 A * 1/1995 Lane ............................. 375/340
5,678,221 A * 10/1997 Cahill .......................... 455/312
5,774,837 A * 6/1998 Yeldener et al. .............. 704/208
5,911,128 A * 6/1999 DeJaco ...................... 704/200.1
5,920,842 A * 7/1999 Cooper et al. ................ 704/503
5,930,747 A * 7/1999 Iijima et al. .................. 704/207
5,937,374 A * 8/1999 Bartkowiak et al. .......... 704/209

(Continued)

FOREIGN PATENT DOCUMENTS

EP 0647375 B1 10/1998
EP 1187100 3/2002
WO WO 9400922 6/1994
WO WO 0131638 3/2001

OTHER PUBLICATIONS

European Search Report for Application No. EP 06 12 3492, dated: Mar. 22, 2007, EPO.

(Continued)

*Primary Examiner* — Pierre-Louis Desir
*Assistant Examiner* — David Kovacek
(74) *Attorney, Agent, or Firm* — Fnewick & West LLP

(57) ABSTRACT

This invention relates to generation of a sample error coefficient suitable for use in an audio signal quality assessment system. The invention provides a method of determining a sample error coefficient between a first signal and a similar second signal comprising the steps of: determining a first periodicity measure from the first signal; determining a second periodicity measure from the second signal; generating a ratio in dependence upon said first periodicity measure and said second periodicity measure; and determining a sampling rate error coefficient in dependence upon said ratio.

19 Claims, 3 Drawing Sheets

(56) References Cited

U.S. PATENT DOCUMENTS

| | | | | | |
|---|---|---|---|---|---|
| 5,978,762 | A * | 11/1999 | Smyth et al. | .................. | 704/229 |
| 6,014,622 | A * | 1/2000 | Su et al. | ........................ | 704/223 |
| 6,047,254 | A * | 4/2000 | Ireton et al. | .................... | 704/209 |
| 6,052,406 | A * | 4/2000 | Epstein et al. | ................ | 375/134 |
| 6,122,607 | A * | 9/2000 | Ekudden et al. | .............. | 704/212 |
| 6,178,207 | B1 * | 1/2001 | Richards et al. | .............. | 375/259 |
| 6,330,532 | B1 * | 12/2001 | Manjunath et al. | ........... | 704/219 |
| 6,345,248 | B1 * | 2/2002 | Su et al. | ........................ | 704/223 |
| 6,345,255 | B1 * | 2/2002 | Mermelstein | ................. | 704/500 |
| 6,351,730 | B2 * | 2/2002 | Chen | ............................ | 704/229 |
| 6,442,580 | B1 * | 8/2002 | Machida | ....................... | 708/313 |
| 6,574,593 | B1 * | 6/2003 | Gao et al. | ...................... | 704/222 |
| 6,584,441 | B1 * | 6/2003 | Ojala et al. | .................... | 704/500 |
| 6,650,917 | B2 * | 11/2003 | Diab et al. | .................... | 600/323 |
| 6,714,896 | B1 * | 3/2004 | Barrett | .......................... | 702/189 |
| 7,043,383 | B2 * | 5/2006 | Lee et al. | ........................ | 702/78 |
| 7,075,627 | B2 * | 7/2006 | Soli | ................................ | 356/28 |
| 7,321,851 | B2 * | 1/2008 | Andrsen et al. | ............... | 704/211 |
| 7,388,937 | B1 * | 6/2008 | Rodger et al. | ................ | 375/348 |
| 7,571,093 | B1 * | 8/2009 | Cusmariu | ..................... | 704/207 |
| 7,788,571 | B2 * | 8/2010 | Waschura et al. | ............. | 714/795 |
| 7,818,168 | B1 * | 10/2010 | Cusmariu | ..................... | 704/209 |
| 2001/0005423 | A1 * | 6/2001 | Rhoads | ......................... | 382/100 |
| 2002/0069052 | A1 * | 6/2002 | Chen | ............................ | 704/230 |
| 2003/0016770 | A1 * | 1/2003 | Trans et al. | ................... | 375/346 |
| 2003/0036689 | A1 * | 2/2003 | Diab et al. | .................... | 600/323 |
| 2003/0097260 | A1 * | 5/2003 | Griffin et al. | ................. | 704/230 |
| 2003/0219087 | A1 * | 11/2003 | Boland | ......................... | 375/371 |
| 2004/0062252 | A1 * | 4/2004 | Dowdal et al. | ........... | 370/395.62 |
| 2004/0153316 | A1 * | 8/2004 | Hardwick | ..................... | 704/214 |
| 2004/0166809 | A1 * | 8/2004 | Dickey | ....................... | 455/67.11 |
| 2004/0178936 | A1 * | 9/2004 | Lee et al. | ...................... | 341/120 |
| 2004/0235439 | A1 * | 11/2004 | Husted et al. | ................. | 455/136 |
| 2005/0043959 | A1 * | 2/2005 | Stemerdink et al. | .......... | 704/500 |
| 2005/0154584 | A1 * | 7/2005 | Jelinek et al. | ................. | 704/219 |
| 2005/0286627 | A1 * | 12/2005 | Tabatabaei | .................... | 375/238 |
| 2006/0095256 | A1 * | 5/2006 | Nongpiur et al. | ............. | 704/207 |
| 2007/0033448 | A1 * | 2/2007 | Waschura et al. | ............. | 714/704 |
| 2007/0136012 | A1 * | 6/2007 | Miller | ............................. | 702/67 |
| 2007/0268846 | A1 * | 11/2007 | Proctor et al. | ................ | 370/279 |
| 2008/0004821 | A1 * | 1/2008 | Cranford et al. | ................ | 702/69 |
| 2008/0106249 | A1 * | 5/2008 | Barrett et al. | .............. | 324/76.38 |

OTHER PUBLICATIONS

Elsevier Science B.V., Speech Communications 16 (1995), Eric Moulines and Jean Laroche, "Non-parametric techniques for pitch-scale and time-scale modification of speech", Mar. 29, 1994, revised Oct. 27, 1994, pp. 175-205.

European Extended Search Report, European Application No. 06123492.8, Apr. 4, 2007, 7 pages.

European Examination Report, European Application No. 06123492.8, Nov. 28, 2008, 1 page.

European Examination Report, European Application No. 06123492.8, Apr. 27, 2009, 4 pages.

Hawksford, M., "Non-Invasive Identification of Audio Content for High Resolution Applications," 111th Audio Engineering Society Convention, Sep. 21, 2001, 14 pages.

* cited by examiner

GENERATING SAMPLE ERROR COEFFICIENTS

BACKGROUND a. Field of the Invention

This invention relates to a method of generating sample error coefficients, in particular for use in an audio signal assessment system.

Signals carried over telecommunications links can undergo considerable transformations, such as digitisation, encryption and modulation. They can also be distorted due to the effects of lossy compression and transmission errors.

The perceived quality of a speech signal carried over telecommunications links can be assessed in a subjective experiment. Such experiments aim to find the average user's perception of a system's speech quality by asking a panel of listeners a directed question and providing a limited response choice. For example, to determine listening quality users are asked to rate "the quality of the speech" on a five-point scale from Bad to Excellent. The mean opinion score (MOS), for a particular condition is calculated by averaging the ratings of all listeners. However, subjective experiments are time consuming and expensive to run.

Objective processes that aim to automatically predict the MOS value that a signal would produce in a subjective experiment are currently under development and are of application in equipment development, equipment testing, and evaluation of system performance.

Some objective processes require a known (reference) signal to be played through a distorting system (the communications network or other system under test) to derive a degraded signal, which is compared with an undistorted version of the reference signal. Such systems are known as "intrusive" quality assessment systems, because whilst the test is carried out the channel under test cannot, in general, carry live traffic.

The use of an automated system allows for more consistent assessment than human assessors could achieve, and also allows the use of compressed and simplified test sequences, which give spurious results when used with human assessors because such sequences do not convey intelligible content.

b. Related Art

A number of patents and applications relate to intrusive quality assessment, most particularly European Patent 0647375, granted on 14 Oct. 1998. In this invention two initially identical copies of a test signal are used. The first copy is transmitted over the communications system under test. The resulting signal, which may have been degraded, is compared with the reference copy to identify audible errors in the degraded signal. These audible errors are assessed to determine their perceptual significance—that is, errors that are considered significant by human listeners are given greater weight than those that are not considered so significant. In particular inaudible errors are perceptually irrelevant and need not be assessed.

One problem with known methods of intrusive quality assessment is that if there is even a slight difference between the sampling rate of a reference signal and a degraded signal then the resultant MOS can be artificially low (ie the MOS predicted by the automated system does not match that which would be given by a human listener).

This problem can happen for sampling-errors as small as 0.01%, and is due to the fact that if the reference signal is sampled at rate R and the degraded signal is sampled at a rate R+e, then this difference in sampling rate e will mean that the spectral content of the two signals will no longer be aligned in terms of frequency. This alignment error is proportional to frequency and is therefore worse at high frequencies.

Sampling-error is most likely to occur if one or more stages of the end-to-end chain, including the test system itself, includes an analogue stage. In this situation, the effective sample rates of the reference and degraded signals may be determined by different clock sources, and consequently any difference between the clock rates will result in a sample-error. Another source of error can be up or down-sampling operations performed in software that uses approximate sample conversation factors.

One of the requirements of any solution is that it must work in the presence of time-warping algorithms. This condition is satisfied by this invention because it is based on an analysis of the periodic parts of one a test signal and the purpose of a time-warping algorithm is to increase or decrease the duration of a part of a signal without changing the pitch period, i.e. the periodicity.

SUMMARY OF THE INVENTION

This invention is of application in objective models that predict the subjective quality of a transmission system by comparing a transmitted (known) and received (possibly degraded) signal. The invention applies equally well to models designed to address general audio signals, and to models designed to address a specific subset of audio signals, such as speech or music. The invention enhances the accuracy of the subjective quality prediction in the presence of a sampling error between the transmitted and received signal through the following steps:

1. Exploiting periodicity in a test signal to determine any sample-error that may be introduced by the end-to-end test chain by detecting any change in the periodicity between a transmitted and received signal; the test signal may be a pilot signal used solely for the purpose of measuring the sample-error or a reference and degraded signal pair to be analysed by the speech or audio quality measure.
2. Matching the sample rates of the reference and degraded signals by re-sampling at least one of the two signals to be analysed by the speech or audio quality measure.

According to the invention there is provided a method of determining a sample error coefficient between a first signal and a similar second signal comprising the steps of: a) determining a first periodicity measure from the first signal; b) determining a second periodicity measure from the second signal; c) generating a ratio in dependence upon said first periodicity measure and said second periodicity measure; d) determining a sampling rate error coefficient in dependence upon said ratio.

Preferably, the first signal is a first known signal to be transmitted via a communications channel and the second signal is a first received signal, being a possibly degraded version of said first known signal, received via said communications channel.

In one embodiment the first known signal is a signal comprising a tone or a plurality of tones.

In one embodiment, the steps a) and b) of determining a periodicity measure comprise the step of determining the pitch period of the respective signal which may be determined in dependence upon the position of a peak in the autocorrelation function of each signal. Alternatively the measure may be determined in dependence upon the frequency of one or more peaks in the Fourier Transform of each signal.

Preferably the first signal is separated into segments and for each of a plurality of segments of the first signal a segment sampling rate error is determined in accordance with the steps of: selecting a segment of the second signal where a similarity measure exceeds a predetermined threshold; and determining a segment sample rate error coefficient in dependence upon a segment first periodicity measure and a segment second periodicity measure; and wherein the sampling rate error coefficient is determined at step d) in dependence upon the plurality of segment sample rate coefficients so obtained.

Preferably, only segments are used which have a periodic component.

Preferably, the plurality of segment sample rates are used to form a histogram and the sampling rate error coefficient is determined at step d) by selecting the histogram bin having the greatest number of coefficients. Alternatively, the sampling rate error coefficient is determined by interpolating between multiple histogram bins, preferably on the basis of the relative number of coefficients in each bin.

The method is of particular use in objective methods of estimating the quality of a communications channel where sample errors can affect the estimated quality, whereas the subjective quality is not affected to the extent suggested.

According to another aspect of the invention there is also provided a method of estimating the quality of a communications channel comprising the steps of: e) transmitting a second known signal via said communications channel; f) receiving a second received signal, being a possibly degraded version of said known signal, via said communications channel g) comparing a copy of the second known signal to the second received signal; and h) generating a quality measure based on said comparison; characterised in that: the comparing step comprises the sub-steps of: i) determining a sampling rate error coefficient according to the method described above; j) resampling the received signal in dependence upon said sampling rate error coefficient to generate a resampled signal; and k) comparing the known signal to the resampled signal.

The first known signal may be the same signal as the second known signal and the first received signal may be the same signal as the second received signal.

The resampling step j) is preferably performed using a truncated sin(x)/x transfer function.

BRIEF DESCRIPTION OF THE DRAWINGS

An embodiment of the invention will now be described, by way of example only, with reference to the accompanying drawings, in which.

DETAILED DESCRIPTION

Figure 1:
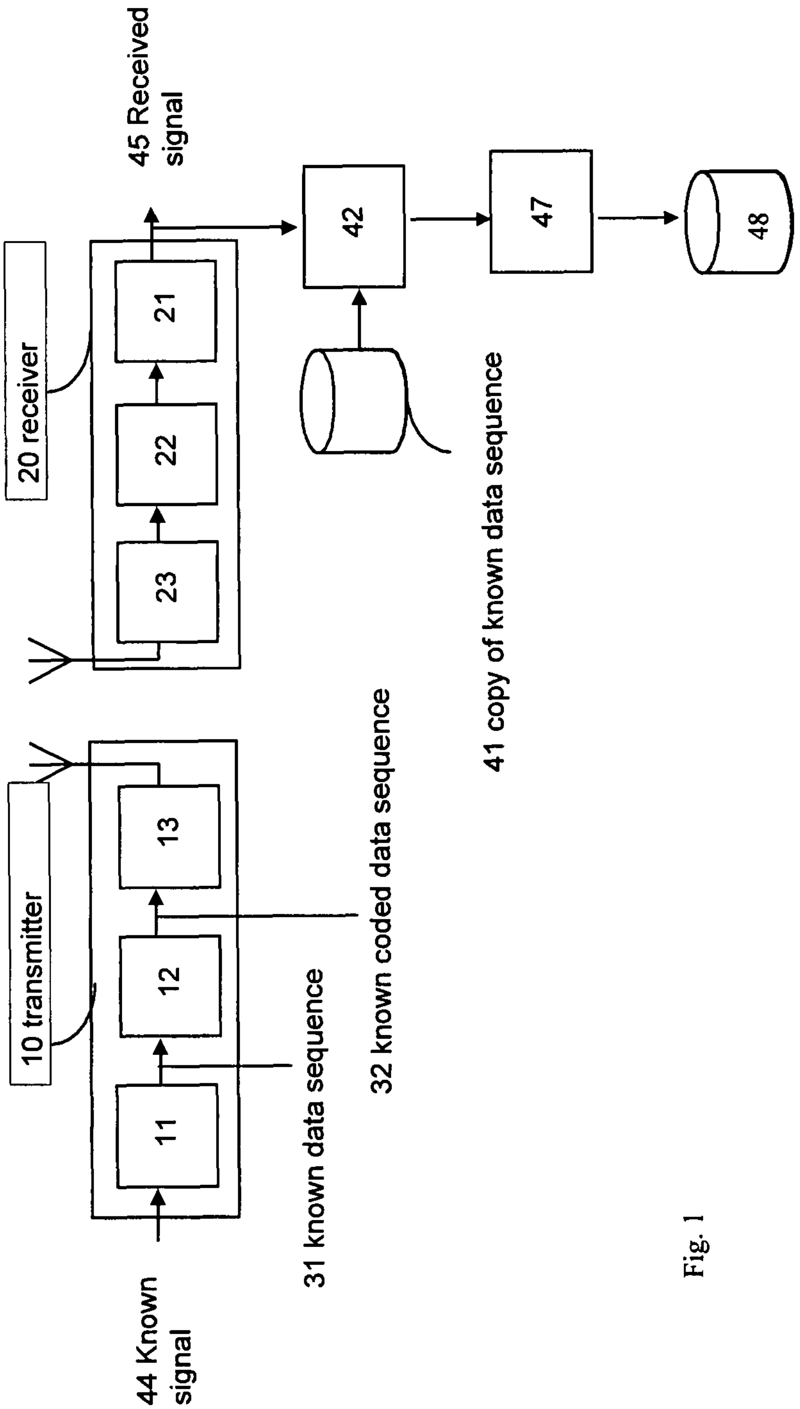
FIG. 1 is a block diagram illustrating an apparatus for measuring error characteristics in a communications channel.

FIG. 1 depicts an apparatus for measuring the perceived quality of a communications channel. The communication channel comprises a transmitter 10 and a receiver 20.

The transmitter 10 comprises a source encoder 11 which receives an analogue signal and samples and codes said signal, to produced a source encoded data signal, a channel encoder 12 which receives a source encoded data signal and produces a channel encoded data signal, and a modulator 13. The receiver 20 comprises a corresponding demodulator 23, a channel decoder 22, and a source decoder 21.

The received signal 45 is received at the output of the source decoder 21 is compared with a local copy 41 of the known data signal by comparator 42 and the results of the comparison is used by an intrusive quality assessment model 47 to produce an estimate 48 of the perceptual quality of the received signal 45.

Figure 2:
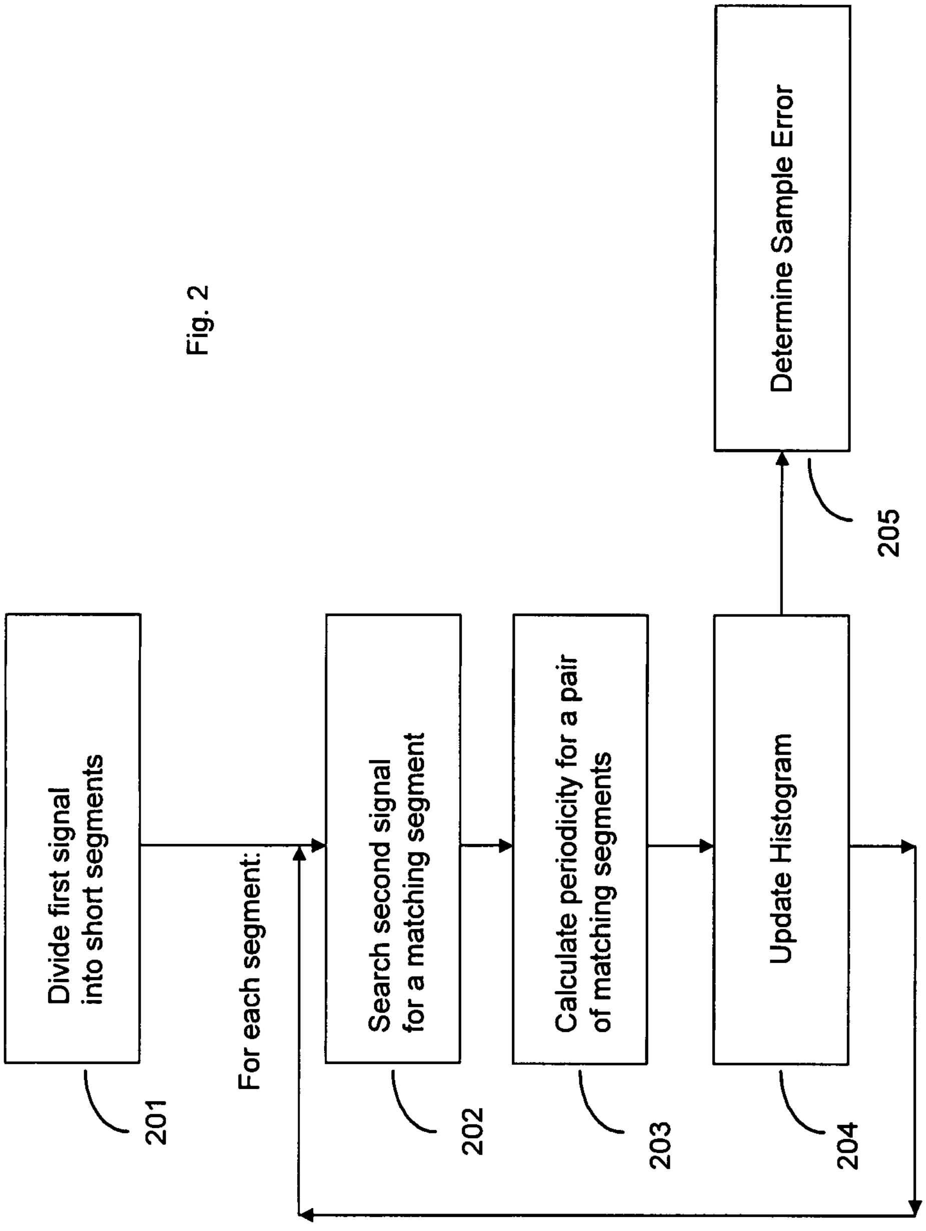
FIG. 2 is a flow chart illustrating the process of sample error coefficient generation of the present invention.

FIG. 2 illustrates the process of sample error generation of the present invention. A first data signal is divided into one or more segments at step 201. In the preferred embodiment each segment comprises a few tens of milliseconds but in principle a single segment comprising the entire first signal could be used. In general the first signal will include periodic portions for example in voiced speech, or the sound of a tonal musical instrument.

For one or more of the segments a second similar data signal is searched to find a segment matching the corresponding segment of the first signal at step 202. Methods for time-aligning two signals are known in the art and include the calculation of cross-correlation values between a target segment of the degraded signal and multiple candidate segments of the reference signal; the reference segment producing the highest cross-correlation value is deemed to be the best match to the reference segment.

Once a matching segment of the second signal has been identified then for a matching pair of segments a measure of periodicity is calculated for each such segment at step 203. In the preferred embodiment the measure of periodicity is a measure of pitch period which is obtained by calculating the autocorrelation function of the segment and calculating the pitch corresponding to the highest peak in the function (the peak corresponding to zero offset is excluded). Those skilled in the art will appreciate that other estimates of periodicity can be used too, for example zero-crossing rate, Cepstral methods or spectral peak analysis.

The ratio between the measurement of periodicity for each of the matching segments is then determined. This is done for each matching segment pair and the one or more ratios thus obtained are used to generate a sample error coefficient at step 205.

In the preferred embodiment each ratio is used to update a histogram at step 204 which counts the number of ratios falling within a predetermined set of ranges (known as bins). The mid range value of the bin having the greatest number of ratios may be used to determine the sample error coefficient. In the preferred embodiment an average of the values of the ratios in the bin having the greatest number of ratios is used. In an alternative embodiment interpolation between two or more bins may be used to determine the sample error coefficient by weighting the value of each bin in proportion to the number of coefficients therein.

In one embodiment the sample-error analysis may be performed over the whole signal (ie using all of the segments) because the pitch-period estimates for non-periodic sounds will be randomly distributed and will therefore not affect the position of the histogram peak. However, if other methods of determining periodicity are used, it may be advantageous to restrict the sample error calculation to segments containing a periodic component; techniques for identifying such portions are well known in the art and include applying a threshold to the peak in the autocorrelation function of a signal.

The method is particularly applicable to determining the sample error introduced when a signal is transmitted over a communications channel or the sample error introduced by the test and measurement equipment used to send and receive test signals.

The sample-error may be measured using a known signal transmitted via the communications channel and a received possibly degraded version of the known signal received via the communications channel. The known signal may be an audio signal comprising speech or music or it may be a pilot signal comprising one or more simultaneous tones which is passed through the system under test. In this case the sample-error is then determined by calculating the ratio of the frequencies of the transmitted and received tone or tones. Suitable methods of measuring the frequency of such tones include but are not limited to the Fast Fourier Transform (FFT) and the Discrete Fourier Transform (DFT), which may be calculated using the Goetzl method.

Figure 3:
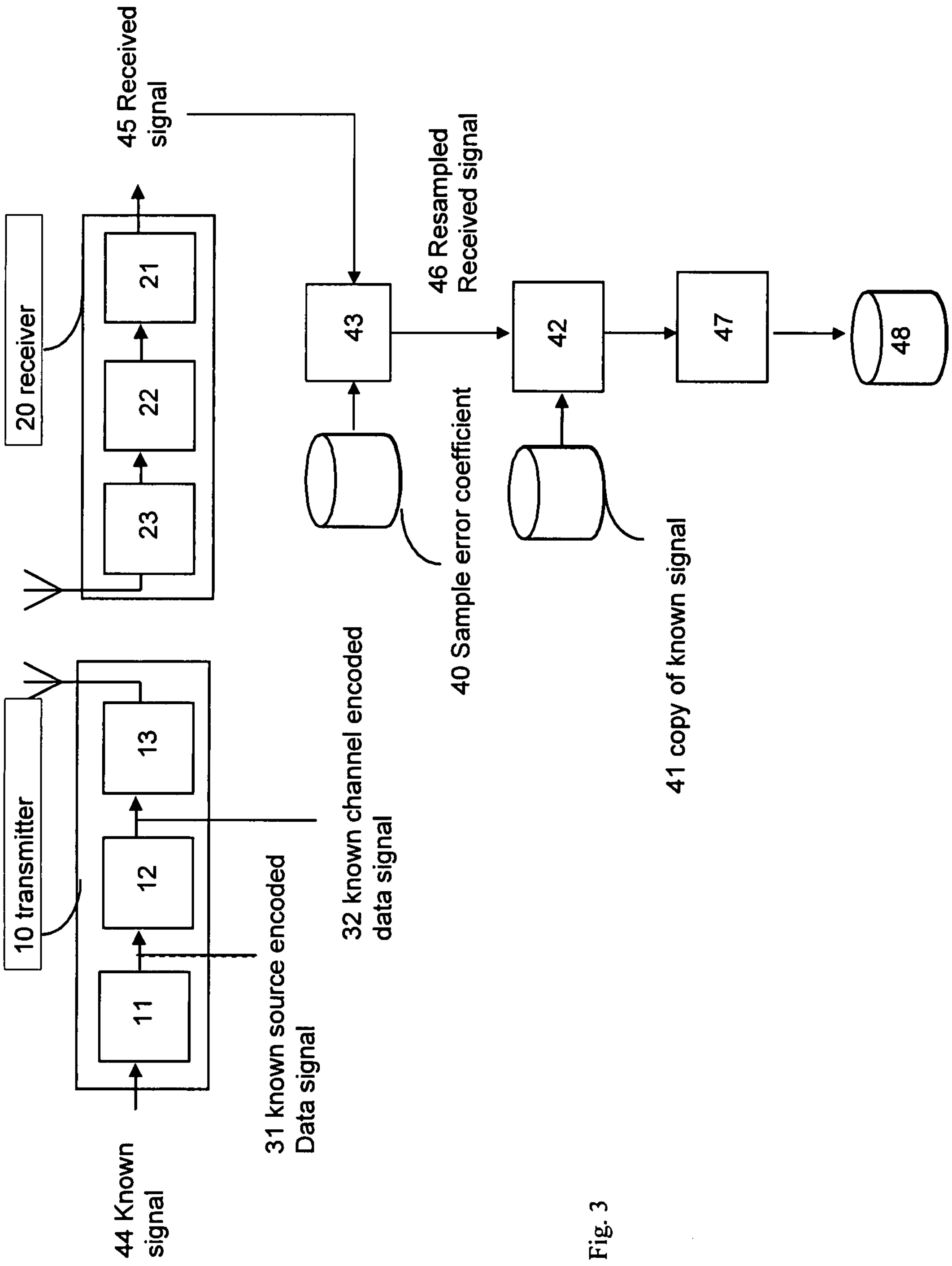
FIG. 3 is a block diagram illustrating an improved apparatus for measuring error characteristics in a communications channel.

FIG. 3 is a block diagram illustrating an improved apparatus for measuring the quality of a communications channel using a resampling error coefficient.

A known data signal 44 is transmitted via said communications channel as is well known in the art. A received signal 45, is received via said communications channel. A copy 41 of the known signal is compared to the received signal 45 by comparator 42; and a quality measure 48 is generated by the quality assessment model 47 based on a error pattern generated by said comparison, where prior to the comparison, the received signal 45 is resampled by resampling means 43 in dependence upon a sample error coefficient which has been generated as described above.

The know data signal and the received data signal may be the same signals that were used to generate the sample error coefficient, or the sample error coefficient may have been generated by different data signals or by pilot tones as described previously.

It is possible to iterate the process by repeatedly measuring the sample error and generating a new resampled received signal until the sample error falls to below a predetermined threshold.

The quality assessment model 47 may be, but is not restricted to one such as described in European Patent 0647375, granted on 14 Oct. 1998. In this model the known data signal is compared with the received data signal to identify audible errors in the degraded signal. These audible errors are assessed to determine their perceived significance—that is, errors that are considered significant by human listeners are given greater weight than those that are not considered so significant. In particular inaudible errors are irrelevant to perception and need not be assessed.

This system provides an output comparable to subjective quality measures originally devised for use by human subjects. More specifically, it generates two values, YLE and YLQ, equivalent to the "Mean Opinion Scores" (MOS) for "listening effort" and "listening quality", which would be given by a panel of human listeners when listening to the same signal.

In this particular model, an auditory transform of each signal is taken, to emulate the response of the human auditory system (ear and brain) to sound. The degraded signal is then compared with the reference signal after each has been transformed such that the subjective quality that would be perceived by a listener using the network is determined from parameters extracted from the transforms.

The method described herein may be used to provide sample error coefficients for pairs of signals other than those used in audio signal assessment systems.

It will be understood by those skilled in the art that the processes described above may be implemented on a conventional programmable computer, and that a computer program encoding instructions for controlling the programmable computer to perform the above methods may be provided on a computer readable medium.

It is to be recognised that various alterations, modifications, and/or additions may be introduced into the constructions and arrangements of parts described above without departing from the scope of the present invention as defined in the following claims.

The invention claimed is:

1. A method of determining a sample error coefficient between a first signal and a similar second signal comprising the steps of:

receiving the second signal via a communications channel, the second signal being a transmitted version of the first signal;

dividing the first signal into a first plurality of segments;

dividing the second signal into a second plurality of segments;

determining a first periodicity measure of one of the first plurality of segments and a second periodicity measure of one of the second plurality of segments;

determining that the first periodicity measure and the second periodicity measure exhibit similarity which exceeds a similarity threshold;

determining a third periodicity measure of another of the first plurality of segments and a fourth periodicity measure of one of the second plurality of segments;

determining that the third periodicity measure and the fourth periodicity measure exhibit similarity which exceeds the similarity threshold;

generating a first ratio in dependence upon said first periodicity measure and said second periodicity measure and a second ratio in dependence upon said third periodicity measure and said fourth periodicity measure;

determining a first segment sample rate error coefficient based on the first ratio;

determining a second segment sample rate error coefficient based on the second ratio; and determining a sampling rate error coefficient based on both the first and second segment sample rate error coefficients.

2. A method according to claim 1, in which the first signal is a first known signal to be transmitted via the communications channel and the second signal is a first received signal, being a possibly degraded version of said first known signal, received via said communications channel.

3. A method according to claim 2, in which the first known signal is a signal comprising a tone.

4. A method according to claim 3, in which the first known signal is a signal comprising a plurality of tones.

5. A method according to claim 1, in which the steps of determining the first periodicity measure and the second periodicity measure comprise the step of determining the pitch period of each signal.

6. A method according to claim 5, in which the pitch period is determined in dependence upon the position of a peak in the autocorrelation function of each signal.

7. A method according to claim 1, in which the determining the first periodicity measure and the second periodicity measure depends upon the frequency of one or more peaks in the Fourier Transform of each signal.

8. A method according to claim 1, in which the first plurality of segments and second plurality of segments comprise segments having a periodic component.

9. A method according to claim 1, in which the first segment sample rate error coefficient and second segment sample rate error coefficient are used to form a histogram and the sampling rate error coefficient is determined by selecting a value from a histogram bin having the greatest number of coefficients.

10. A method according to claim 9, in which said value is selected by generating an average of the values in the histogram bin having the greatest number of coefficients.

11. A method according to claim 1, in which sample rates of the first plurality of segments and second plurality of segments are used to form a histogram and the sampling rate error coefficient is determined by interpolating between multiple histogram bins.

12. A method according to claim 1, further comprising:

receiving the second signal, the second signal being a possibly degraded version of the first signal, via said communications channel;

resampling the second signal in dependence upon said sampling rate error coefficient to generate a resampled signal;

comparing the first signal to the resampled signal and generating an error pattern; and generating a quality measure of the communications channel based on the comparison of the first signal to the resampled signal and the generated error pattern.

13. A method according to claim 12 in which resampling the second signal is performed using a truncated sin(x)/x transfer function.

14. A non-transitory computer readable storage medium storing executable computer program instructions for determining a sample error coefficient between a first signal and a similar second signal, the instructions performing steps comprising:

receiving the second signal via a communications channel, the second signal being a transmitted version of the first signal;

dividing the first signal into a first plurality of segments;

dividing the second signal into a second plurality of segments;

determining a first periodicity measure of one of the first plurality of segments and a second periodicity measure of one of the second plurality of segments;

determining that the first periodicity measure and the second periodicity measure exhibit similarity which exceeds a similarity threshold;

determining a third periodicity measure of another of the first plurality of segments and a fourth periodicity measure of one of the second plurality of segments;

determining that the third periodicity measure and the fourth periodicity measure exhibit similarity which exceeds the similarity threshold;

generating a first ratio in dependence upon said first periodicity measure and said second periodicity measure and a second ratio in dependence upon said third periodicity measure and said fourth periodicity measure;

determining a first segment sample rate error coefficient based on the first ratio;

determining a second segment sample rate error coefficient based on the second ratio; and determining a sampling rate error coefficient based on both the first and second segment sample rate error coefficients.

15. The computer readable storage medium of claim 14, wherein determining the first periodicity measure and the second periodicity measure depends upon the frequency of one or more peaks in the Fourier Transform of each signal.

16. The computer readable storage medium of claim 14, wherein the first plurality of segments and second plurality of segments comprise segments having a periodic component.

17. The computer readable storage medium of claim 14, wherein the first segment sample rate error coefficient and second segment sample rate error coefficient are used to form a histogram and the sampling rate error coefficient is determined by selecting a value from a histogram bin having the greatest number of coefficients.

18. The computer readable storage medium of claim 14, wherein sample rates of the first plurality of segments and second plurality of segments are used to form a histogram and the sampling rate error coefficient is determined by interpolating between multiple histogram bins.

19. The computer readable storage medium of claim 14, the steps further comprising:

receiving the second signal, the second signal being a possibly degraded version of the first signal, via said communications channel;

resampling the second signal in dependence upon said sampling rate error coefficient to generate a resampled signal;

comparing the first signal to the resampled signal and generating an error pattern; and generating a quality measure of the communications channel based on the comparison of the first signal to the resampled signal and the generated error pattern.

* * * * *